INVENTORS
Oliver K. Kelley,
Gilbert K. Hause,
Burnette Heck
D. C. Staley
THEIR ATTORNEY

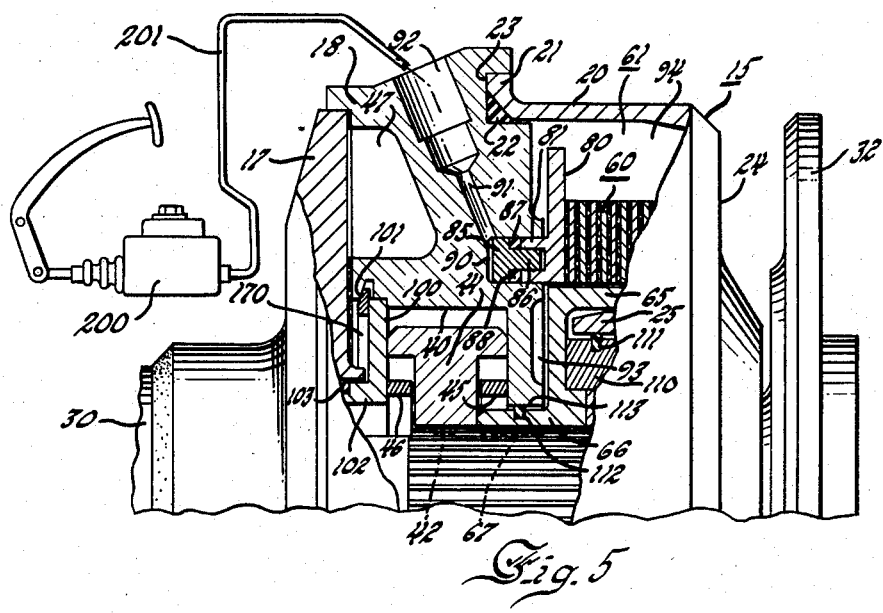

Oct. 11, 1960   O. K. KELLEY ET AL   2,955,682
LIQUID COOLED FRICTION BRAKE
Original Filed Aug. 22, 1955   5 Sheets-Sheet 5
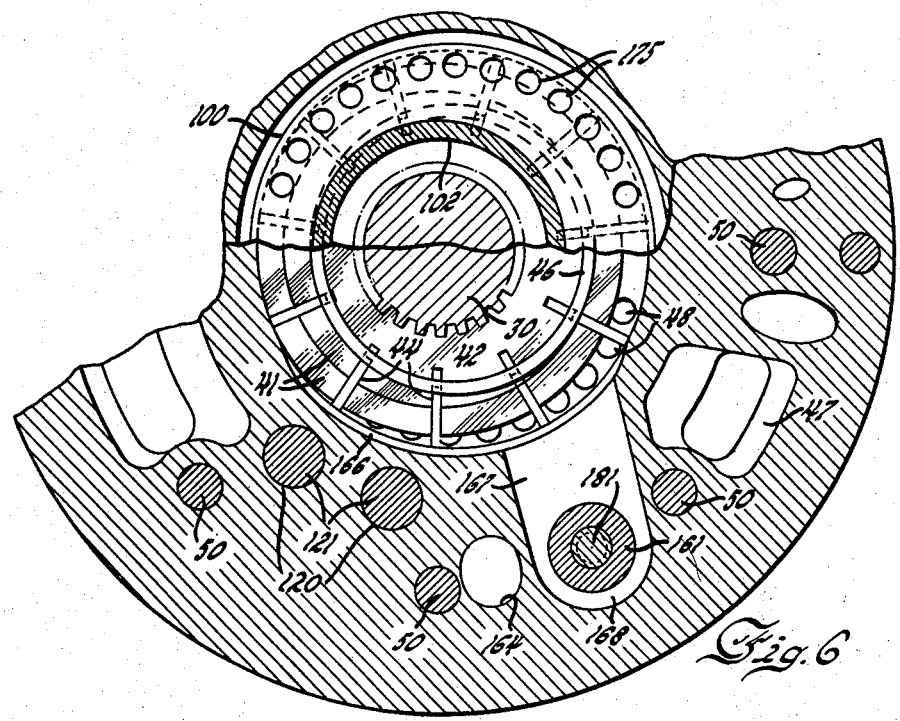
INVENTORS
Oliver K. Kelley,
BY Gilbert K. Hause,
Burnette Heck
D. C. Staley
THEIR ATTORNEY United States Patent Office 2,955,682
Patented Oct. 11, 1960

2,955,682

LIQUID COOLED FRICTION BRAKE

Oliver K. Kelley, Gilbert K. Hause, and Burnette Heck, Bloomfield Hills, Mich., assignors to General Motors Corporation, Detroit, Mich., a corporation of Delaware Original application Aug. 22, 1955, Ser. No. 529,671, now Patent No. 2,835,357, dated May 20, 1958. Divided and this application Jan. 17, 1958, Ser. No. 709,609

2 Claims. (Cl. 188—72)

This invention relates to a brake for a motor vehicle, and particularly to a multiple disk brake adapted to have the cooling fluid circulated through the brake to remove heat of friction.

An object of the invention is to provide an improved and compact structural arrangement of a multiple disk brake incorporating a fluid pump within the brake for effecting liquid circulation through the brake for removing heat of friction.

Further objects and advantages of the present invention will be apparent from the following description, reference being had to the accompanying drawings wherein a preferred form of the invention is clearly shown.

In the drawings:

Figure 4 is a cross sectional view taken along line 4—4 of Figure 1.

Figure 5 is a cross sectional view taken along line 5—5 of Figure 1.

Figure 6 is a cross sectional view taken along line 6—6 of Figure 4.

Figure 7 is a cross sectional view taken along line 7—7 of Figure 4.

Figure 8 is a cross sectional view taken along line 8—8 of Figure 4.

Figure 1:
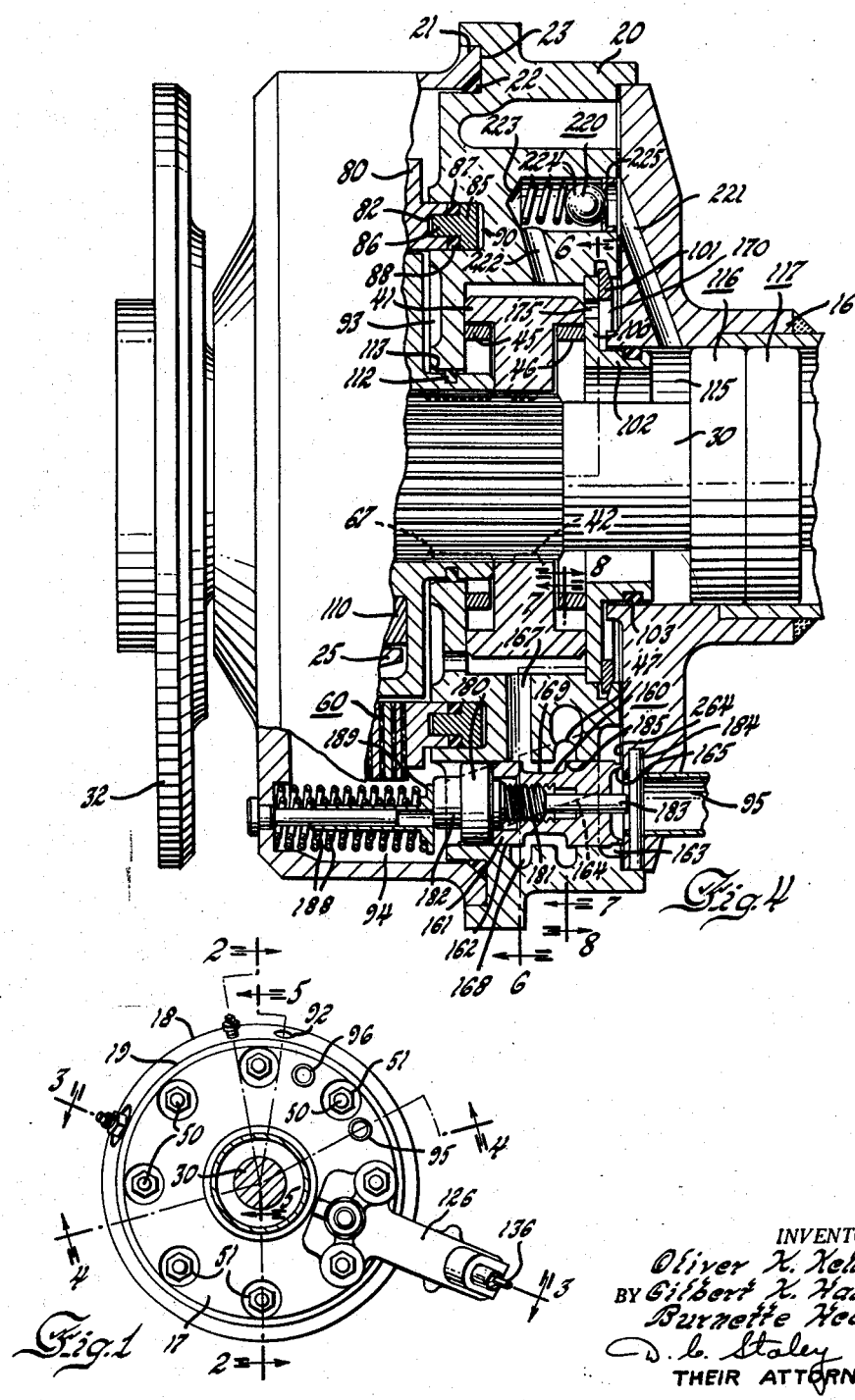
Figure 1 is an end view of a wheel and brake structure incorporating features of this invention.

In the drawings there is illustrated a wheel 10 that carries a multiple disk brake structure 15. The structure consists of an axle housing 16 that extends from a conventional differential housing (not shown). The axle housing 16 has a radial flange 17 at the out-board end thereof. A well member 18 is supported upon the flange 17, being axially centralized relative to the flange 17 by the angular projection 19 around the flange 17. A dish shaped housing 20 is supported on the wall member 18 by the flanged open end 21, an annular seal ring 22 being provided between the flange 21 and the recess wall 23 provided in the wall member 18.

The housing 20 and the wall member 18 are secured together as well as being mounted upon the axle housing flange 17 by means of the studs 50 having the nuts 51 on the ends thereof. An annular seal ring 53 is provided around each of the studs 50.

The housing 20 has a substantially radial wall 24 from which there extends an annular hub 25 that receives an anti-friction bearing 26 having the outer race 27 carried in the hub 25 and the inner race 28 carried on the axle shaft 30 and supporting the same. Ball bearings 29 are provided between the races 27 and 28.

The anti-friction bearing 26 is retained in place in the annular hub 25 by means of the snap ring 31 fitting within the groove 52 provided in the inner periphery of the annular hub 25.

The axle shaft 30 carries a wheel flange 32 that supports the studs 33 which receive the nuts 34 to retain the wheel flange 35 on the flange 32.

A resilient annular seal member 36 is located between the inner race 28 and the outer race 27 of the anti-friction bearing 26. A resilient annular seal 37 is provided between the outer race 27 and the inner periphery of the hub 25 that receives the race 27.

The wall member 18 of the brake is provided with a central pump cavity 40 in which there is located a pump ring 41 having a splined connection 42 with the axle shaft 30. The pump cavity 40 is closed by a wall member 100 retained in position by means of the snap ring 101. The wall member 100 has an annular flange portion 102 disposed within the flange 17 of the axle housing 16 with a resilient annular seal 103 between the flange portion 102 and the axle housing 16. The pump ring 41 has a plurality of radial slots 43 each of which receives a pump vane 44. The vanes 44 are held outwardly against the inner periphery of the pump chamber 40 by means of the retaining rings 45 and 46.

An inlet passage 47 is provided in the wall 18 and connects with a valve controlled by-pass more fully described hereinafter. The pump exhausts fluid from the pump cavity 40 through port openings 48 provided in the wall 49 of the pump cavity 40.

A multiple brake disk assemblage 60 is provided in the brake chamber 61 formed by the housing 20 and the wall member 18. The brake disks 62 each have projections extending radially of the disk that engage the studs 50 whereby to retain the disks 62 stationary relative to the housing 20. The brake disks 63 that are disposed between the disks 62 have a splined connection 64 with an annulus portion 65 of a brake disk carrier 70 that has an inner annulus portion 66 carried on the axle shaft 30 and connected therewith through the spline connection 67.

The annulus portion 64 that supports the rotatable brake disks 63 encircles the annular hub portion 25 of the housing 20 with the brake disk assemblage 60 also encircling the annnulus portion 64 as well as the hub portion 25 to provide for a compact supporting structure for the brake disks.

The brake disks 62 and 63 are urged into braking engagement upon actuation thereof by means of an annular pressure plate 80. The pressure plate 80 has an axially extending projection 81 provided with an axially extending annular recess 82. The annular extension 81 on the pressure plate 80 is slidably disposed in an annular groove 83 provided in the wall 18.

Also received within the annular groove 83 is an annular piston ring 85 that has an annular extension 86 slidably disposed within the annular recess or groove 82 in the pressure plate 80. Resilient rubber-like annular seal rings 87 and 88 are provided between the piston ring 85 and the projection 81 on the pressure plate 80. The piston ring 85 operating within the annular groove 83 provides a chamber 90 forming a wheel cylinder to receive hydraulic fluid from a conventional master cylinder 200 for actuation of the brakes. Fluid from the master cylinder 200 is introduced into the chamber 90 through the passage 91 and the port 92 that is adapted to receive a conventional fitting to which the hydraulic conduit 201 from the master cylinder is connected in conventional manner.

The brake disks 62 or the brake disks 63, either or both, are provided with grooved passages in the engaging faces of the disks through which liquid is circulated from the chamber compartment 93 into the chamber compartment 94 of the brake chamber 61 as effected by discharge of fluid under pressure from the pump cavity 40 into the chamber compartment 93 through the discharge ports 48. Liquid circulated between the brake disks 62 and 63 removes heat of friction from the brake disks while they are in engagement. The cooling fluid is exhausted from the chamber compartment 94 through the exhaust line 95 into a suitable heat exchange system one of which is more particularly disclosed and described in our copending application S.N. 516,282, filed June 17, 1955. Cooling fluid returns from the heat exchange system to the pump cavity through the inlet passage 96.

The brake disk carrier 70 supports a ring 110 that has an annular resilient seal member 111 engaging the inner periphery of the annular hub 25 on the housing 20 to resist leakage of cooling fluid from the chamber compartment 93. However, any fluid leakage that passes the seal 111 enters the area of the anti-friction bearing 26 and places the seal member 36 under positive pressure to prevent loss of fluid through the anti-friction bearing 26. The annulus portion 66 of the carrier 70 is provided with a resilient annular seal member 112 that seals against the inner periphery of an opening 113 in the wall 49 that forms part of the pump cavity 40 whereby to resist leakage of flow of cooling fluid under pressure from the chamber 93 into the interior of the pump ring 41 and thus into the seal chamber 115 in the axle housing 16 that contains the seal members 116 and 117. Each of the seal members 116 and 117 include a resilient rubber member 118 having a spring 119 encircling a lip of the seal member to retain it in engagement with the axle shaft 30. The seals 116 and 117 prevent leakage of fluid from the brake into the axle housing and leakage of differential lubricant in the axle housing into the brake.

To maintain the seal member 116 under positive pressure at all times, the seal chamber 115 receiving leakage fluid from the brake compartment 93 gradually fills with cooling fluid with a pressure build up until the check valve 220 provided in the vent passage 221 opens to allow escape of liquid from the seal chamber 115 back into the pump cavity 40 through the passage 222. A spring 223 retains the check ball 224 on its seat 225 until the pressure build up in the chamber 115 is sufficient to lift the check ball from its seat. This arrangement also prevents suction pressure in the pump from being transmitted directly to the chamber 115.

Figure 3:
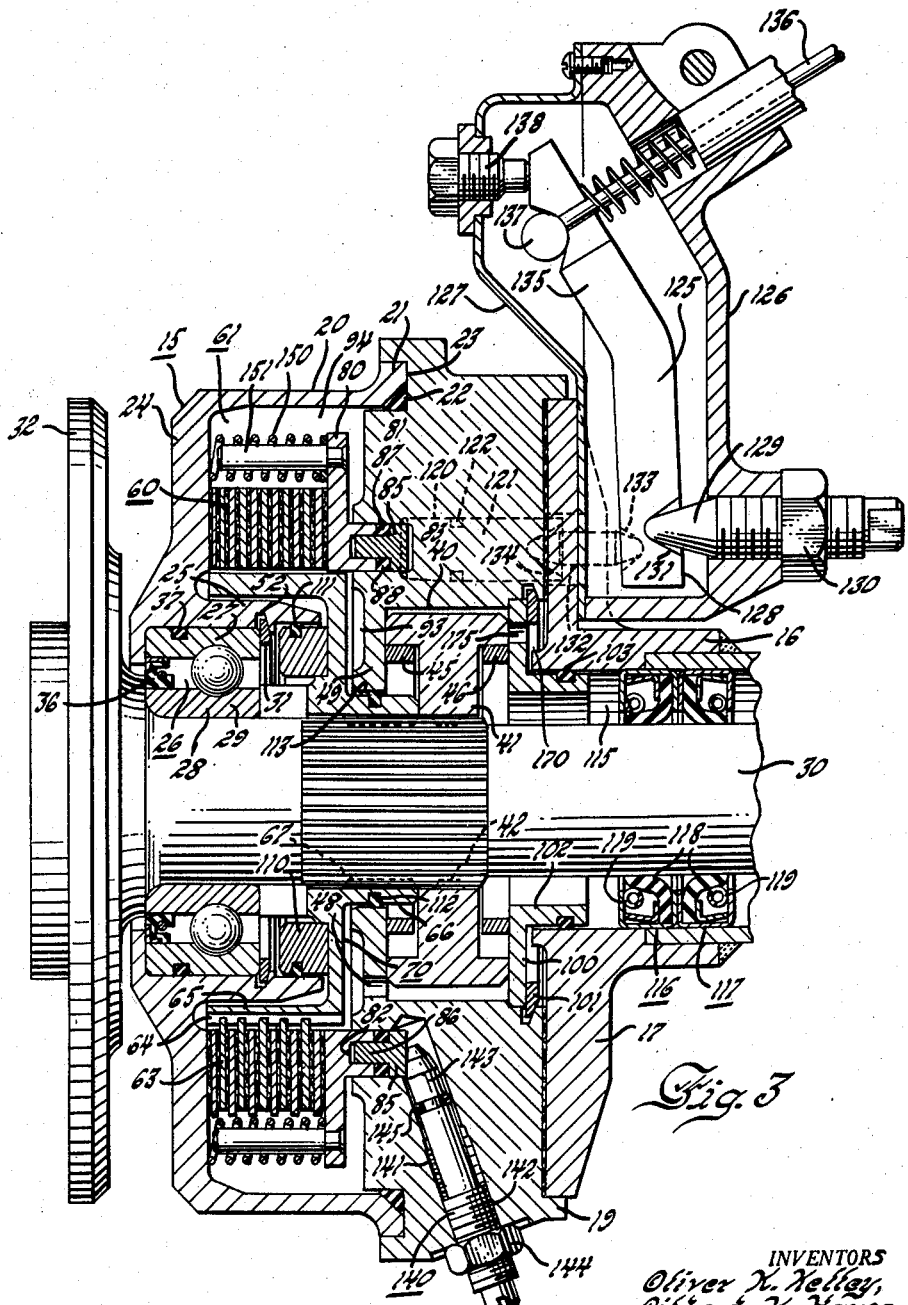
Figure 3 is a cross sectional view taken along line 3—3 of Figure 1.

The brake disk assemblage 60 is normally actuated to effect stoppage of the vehicle as a result of displacement of hydraulic fluid from a master cylinder operated by the brake pedal of the vehicle, the fluid displaced from the master cylinder entering the chamber 90 to move the piston ring 85 against the seal members 87 and 88 and thereby move the pressure plate 80 into engagement with the disk assemblage 60 to effect engagement of the brake disks. It is also desirable to have another independently operated brake actuating mechanism to effect engagement of the brake disks at times when the vehicle is parked. Such a mechanism is illustrated in Fig. 3 wherein there is disclosed in the wall member 18 a bore forming a cylinder 120. The cylinder 120 receives a piston plunger 121 that has an annular resilient seal 122 around the same to prevent loss of hydraulic brake fluid between the cylinder wall and the piston, the cylinder 120 being in fluid communication with the brake fluid chamber 90 so that the piston plunger 121 is in engagement with the piston ring 85.

As shown in Fig. 6, there are actually two cylinders 120 in spaced relation, the cylinders 120 having their axes parallel, and each cylinder 120 having a piston 121 therein.

An actuating lever 125 is disposed within a housing 126 closed by a cover member 127. The end 128 of the lever 125 is carried on the fulcrum pin 129 that is threadedly received in the housing 126 and secured in position by the jam nut 130. The fulcrum pin 129 fits within a recess 131 in the lever 125, the fulcrum point being mid-way between the cylinders 120, as illustrated in Fig. 3. Offset from the fulcrum pin 129 are two pins or links 132 that connect between the lever 125 from recesses 133 therein into engagement with the piston plungers 121 as located therein by means of recesses 134. Thus the rotation of the lever 125 about its fulcrum pin 129 causes the links 132 to effect axial movement of the piston plungers 121 and thereby axial movement of the piston ring 85 to effect frictional engagement of the disk assemblage 60.

The lever 125 has its end 135 attached to an operating cable 136 provided with a connection attachment 137 on the end thereof. The position of the lever is adjustably controlled by means of the adjusting screws 138, as well as the adjustable position of the fulcrum pin 129.

Clearance adjustment of the disk assemblage 60, that is the clearance provided between the disks 62 and 63 when the brake disk assemblage is in released condition is regulated by means of the adjusting screw 140. The adjusting screw 140 is threadedly received in the bore 141 through means of the thread connection 142. The forward end 143 of the adjusting screw 140 engages the piston ring 85. The axis of the adjusting screw 140 is angular to, or relatively radial of, the axis of movement of the piston ring 85. Thus rotation of the adjusting screw to effect axial movement of it will cause axial movement of the piston ring 85 and thereby effect clearance adjustment between the brake disks 62 and 63. A jam nut 144 is provided on the adjusting screw to retain it in its adjusted position. An annular seal ring 145 is provided between the adjusting screw and the bore 141 to prevent leakage of hydraulic fluid from the brake fluid chamber 90.

The brake disk assemblage 60 is normally retained in a released or retracted position by means of the retraction springs 150 that are disposed between the pressure plate 80 and wall 24 of the housing 20, the springs being disposed around studs 151 carried in the pressure plate 80. Any number of retraction springs 150 are placed around the periphery of the brake disk assemblage 60 to obtain the desired retraction movement of the pressure plate 80 relative to the disk brake assemblage. The retraction movement is limited by the forward ends 143 of the adjusting screws 140 to maintain a determined clearance adjustment between the disks 62 and 63 of the assemblage 60.

The coolant fluid that is circulated from the exhaust passage 95 into the heat exchange circuit heretofore mentioned and returned to the fluid inlet passage 96 that supplies the pump is circulated internally of the brake until the temperature of the coolant reaches a predetermined minimum value. Under conditions of low atmospheric temperature the viscosity of the cooling fluid is higher than when atmospheric temperature conditions are high. Thus a thermally responsive by-pass control valve 160 is provided to effect circulation of coolant fluid internally of the brake and pump.

The by-pass control valve, illustrated in Fig. 4, comprises a spool 161 that is slidably disposed in a bore 162 provided in the brake housing wall 18. One end of the bore 162 connects with a chamber 163 that in turn is connected with the chamber compartment 94 around the brake disk assemblage 60 by means of a passage 164 whereby coolant fluid in the chamber compartment 94 can pass through the port 164 into the chamber 163. When the spool 161 of the by-pass control valve 160 is in the position illustrated in Fig. 4 the discharge of coolant fluid into the exhaust line 95 is cut off by the valve seat 165 engaging the wall 264 around the exhaust passage 95.

At this time fluid under pressure from the pump cavity 40 is delivered through the groove 166, see Fig. 6, that is of a length substantially equal to the peripheral length of the discharge passages 48 so that the fluid on the high pressure side of the pump will be exhausted into the passage 167 into the chamber 168 around the valve spool 161.

The valve spool 161 has an undercut or recess portion 169 that allows the fluid to pass from the passage 167 and chamber 168 into the inlet chamber 47 for the pump.

Figure 2:
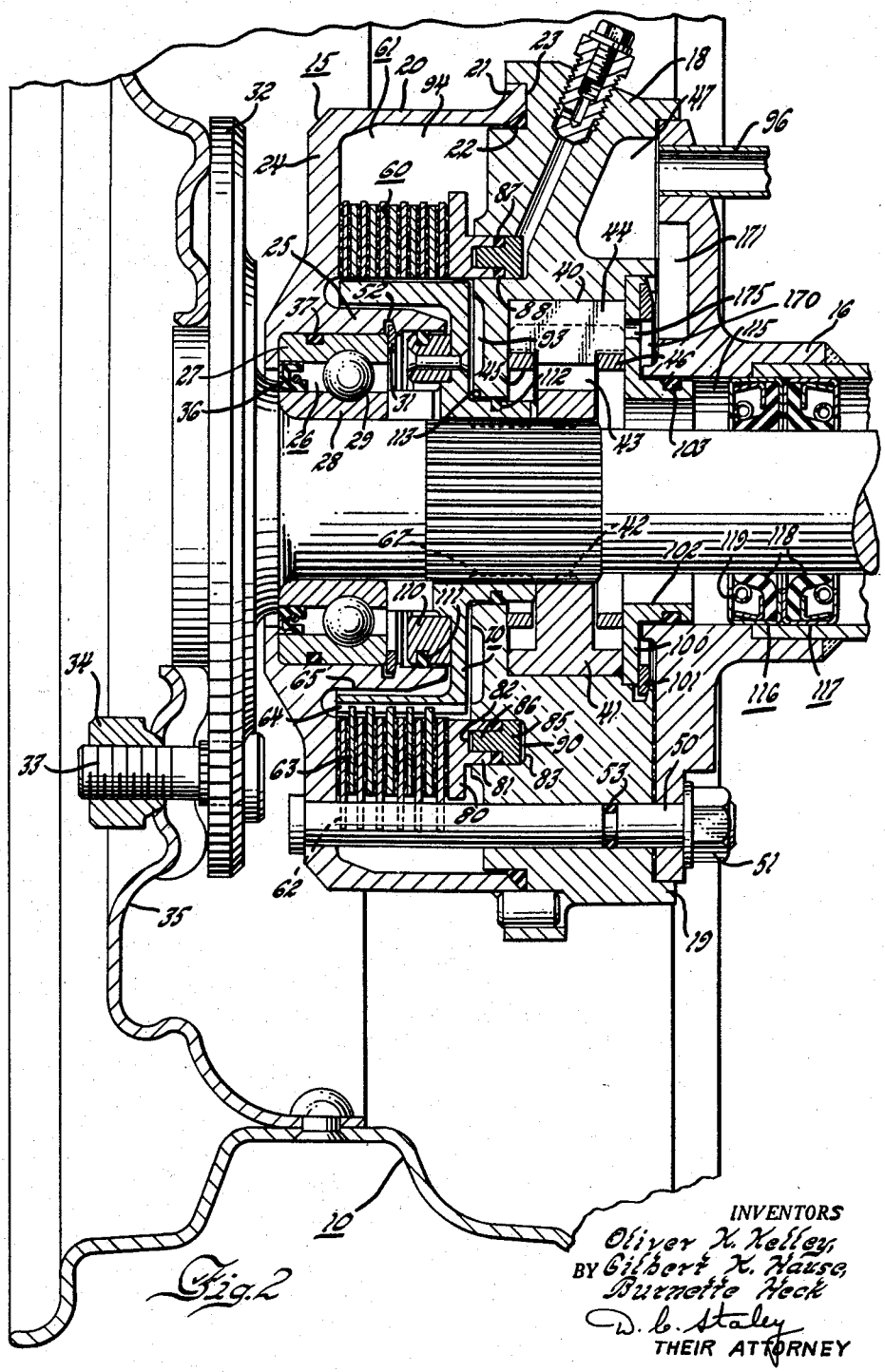
Figure 2 is a cross sectional view taken along line 2—2 of Figure 1.

The inlet chamber 47 that has a chamber portion 47a around the valve spool 161 (see Fig. 7) is connected with the chamber 170 provided between the axle housing flange 17 and the pump wall 100, see Fig. 2 by means of a recess 171 provided in radial flange 17 on the axle housing 16. The return line 96 from the heat exchange system connects with the chamber 47 in the housing wall 18. The pump wall 100 has a plurality of openings 175 forming the inlet openings for the pump cavity 40 and the vane pump therein.

The valve spool 161 of the by-pass control valve 160 carries a thermally responsive device 180 that is secured within the spool 161 by means of a threaded connection 181. The thermally responsive device 180 has the thermally sensitive end 182 thereof positioned within the chamber compartment 94 so as to respond to the temperature of the fluid discharging from between the brake disks 62 and 63. An actuating pin 183 extends from the forward end of the thermally sensitive device 180 and engages a pin 184 extending across the exhaust passage 95 so that when the thermally sensitive device 180 effects extension movement of the pin 183 relative to the body of the device 180, the valve spool 161 will be moved away from the wall 264 to allow fluid under pressure to discharge from the chamber 163 into the outlet line 95 that provides for delivery of coolant fluid to the heat exchange system.

When the spool 161 moves away from the wall 264 the edge 185 of the spool land will close off the by-pass port 186 between the exhaust chamber 168 from the pump and the inlet chamber 47 thereby causing the pump to exhaust all fluid through the exhaust ports 48 into the chamber compartment 93 interiorly of the disk assemblage 60 for circulation between the disks.

Spring members 188 engage a retaining member 189 that holds the by-pass control valve 160 normally in the position shown in Fig. 4 so long as the temperature of the cooling fluid in the chamber compartment 94 is below a predetermined value. This application is a division of our copending application, Serial Number 529,671, filed August 22, 1955, now Patent No. 2,835,357.

While the form of embodiment of the invention as herein disclosed constitutes a preferred form, it is to be understood that other forms might be adapted as may come within the scope of the claims which follow.

What is claimed is as follows:

1. In a multiple disk friction brake, wall means providing a housing forming a closed chamber for circulation of coolant liquid therethrough, axle means extending centrally through said housing, a multiple brake disk assemblage in said closed chamber with some of the disks connected to said axle means to rotate therewith and other of the disks connected to said housing stationarily, and hydraulic mechanism to effect brake actuation of said assemblage comprising an annular wheel cylinder recess and an annular piston therein in the wall of said housing with the piston being a part of the assemblage to effect actuation thereof, a passage in said housing extending from said cylinder recess angularly outwardly from the recess relative to the axis of the recess with one end of the passage terminating in the cylinder recess and extending to a periphery of the housing, said passage having a smooth bored cylindrical portion extending from said cylinder recess immediately adjacent thereto and having a threaded portion adjacent the periphery of the housing, a plunger member positioned in said passage having a smooth peripheral portion at one end thereof positioned in the smooth bored portion of said passage with a conical end portion extending from the end of the smooth peripheral portion into said cylinder recess into engagement with said annular piston forming a stop against which said piston rests and having a threaded portion on the opposite end thereof threadedly engaging the threaded portion of said passage, said plunger member being axially movable in said passage on rotation thereof to move into and out of said cylinder recess for axial positioning of said piston in said recess, and locking means on the threaded end of said plunger positively locking the same against rotation.

2. In a multiple disk friction brake, wall means providing a housing forming a closed chamber for circulation of coolant liquid therethrough, axle means extending centrally through said housing, a multiple brake disk assemblage in said closed chamber with some of the disks connected to said axle means to rotate therewith and other of the disks connected to said housing stationarily, and hydraulic mechanism to effect brake actuation of said assemblage comprising an annular wheel cylinder recess and an annular piston therein in the wall of said housing with the piston being a part of the assemblage to effect actuation thereof, a passage in said housing extending from said cylinder recess angularly outwardly from the recess relative to the axis of the recess with one end of the passage terminating in the cylinder recess and extending to a periphery of the housing, said passage having a smooth bored cylindrical portion extending from said cylinder recess immediately adjacent thereto and having a threaded portion adjacent the periphery of the housing, a plunger member positioned in said passage having a smooth peripheral portion at one end thereof positioned in the smooth bored portion of said passage with a conical end portion extending from the end of the smooth peripheral portion into said cylinder recess into engagement with said annular piston forming a stop against which said piston rests and having a threaded portion on the opposite end thereof threadedly engaging the threaded portion of said passage, said plunger having an annular groove in the said smooth peripheral portion thereof containing a resilient seal member engaging the smooth bored portion of the said passage and axially movable in the said portion on axial movement of said plunger to seal against loss of hydraulic fluid from said cylinder recess, said plunger member being axially movable in said passage on rotation thereof to move into and out of said cylinder recess for axial positioning of said piston in said recess, and a locking nut on the threaded end of said plunger positively locking the same against rotation.

References Cited in the file of this patent

UNITED STATES PATENTS

| | | |
|---|---|---|
| 1,936,943 | Kohr | Nov. 28, 1933 |
| 2,172,788 | Christensen | Sept. 12, 1939 |
| 2,253,205 | Eksergian | Aug. 19, 1941 |
| 2,293,600 | Eksergian | Aug. 18, 1942 |
| 2,326,960 | McCune | Aug. 17, 1943 |
| 2,419,113 | Bricker | Apr. 15, 1947 |
| 2,551,253 | DuBois | May 1, 1951 |
| 2,633,941 | Zindler | Apr. 7, 1953 |
| 2,732,036 | Myers | Jan. 24, 1956 |
| 2,762,461 | Naumann | Sept. 11, 1956 |
| 2,788,870 | Heck | Apr. 16, 1957 |
| 2,815,104 | DuShane | Dec. 3, 1957 |

FOREIGN PATENTS

| | | |
|---|---|---|
| 1,095,884 | France | Dec. 29, 1954 |
| 298,857 | Great Britain | Oct. 18, 1928 |